(12) United States Patent
Morikuni

(10) Patent No.: US 8,267,524 B2
(45) Date of Patent: Sep. 18, 2012

(54) PROJECTION SYSTEM AND PROJECTOR WITH WIDENED PROJECTION OF LIGHT FOR PROJECTION ONTO A CLOSE OBJECT

(75) Inventor: Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 427 days.

(21) Appl. No.: 12/354,144

(22) Filed: Jan. 15, 2009

(65) Prior Publication Data

US 2009/0185139 A1    Jul. 23, 2009

(30) Foreign Application Priority Data

Jan. 18, 2008  (JP) .................................. 2008-008809
Dec. 15, 2008  (JP) .................................. 2008-318002

(51) Int. Cl.
*G03B 21/14* (2006.01)
*G03B 21/26* (2006.01)

(52) U.S. Cl. .............................. 353/48; 353/94; 348/744

(58) Field of Classification Search ............... 353/48, 353/94; 348/370, 371, 744; 359/292
See application file for complete search history.

(56) References Cited

U.S. PATENT DOCUMENTS

| | | | | |
|---|---|---|---|---|
| 5,765,314 A | * | 6/1998 | Giglio et al. | 52/7 |
| 6,665,985 B1 | * | 12/2003 | Hennes | 52/7 |
| 6,727,864 B1 | * | 4/2004 | Johnson et al. | 345/1.3 |
| 2002/0171927 A1 | * | 11/2002 | Barnes, III | 359/451 |
| 2003/0227599 A1 | * | 12/2003 | Weissman et al. | 353/94 |
| 2006/0268242 A1 | * | 11/2006 | Belliveau | 353/94 |

FOREIGN PATENT DOCUMENTS

| | | | |
|---|---|---|---|
| JP | 2002-040326 | | 2/2002 |
| JP | 2004085752 A | * | 3/2004 |

\* cited by examiner

*Primary Examiner* — Francis M Legasse, Jr.
(74) *Attorney, Agent, or Firm* — Maschoff Gilmore & Israelsen

(57) ABSTRACT

A projection system includes a first projector and a second projector configured to project light on a light receiving surface according to an image signal. The first projector and the second projector direct light to be supplied to the light receiving surface in a direction along the light receiving surface. A part of an image projected by the first projector overlaps with a part of an image projected by the second projector on the light receiving surface.

15 Claims, 18 Drawing Sheets

PROJECTION SYSTEM AND PROJECTOR WITH WIDENED PROJECTION OF LIGHT FOR PROJECTION ONTO A CLOSE OBJECT

BACKGROUND

1. Technical Field

The present invention relates to a projection system, and more particularly to a technology of the projection system used for presentation or the like, and relates to a projector use in the projection system.

2. Related Art

Recently, a technology of front-projection-type projector which can perform so-called close projection capable of displaying a large screen from a short projection distance has been proposed. The close projection can be achieved by widening angle of light to be projected. The close projection requires only narrow space for displaying a large screen. Moreover, the projector does not become an obstacle for image viewing when light is diagonally projected from a position close to a light receiving surface. Currently, a technology of close projection has been proposed in JP-A-2002-40326, for example. According to the method disclosed in JP-A-2002-40326, angle is widened by using a reflection-type image forming system as a combination of a plurality of reflection mirrors.

When light is diagonally projected from a position close to the light receiving surface, the light is not easily blocked compared with a related-art projector which is disposed at a position away from and opposed to the light receiving surface. For example, in case of the situation that a person giving an explanation uses display produced by the projector capable of performing close projection, shadow of the person on the light receiving surface can be reduced even when the person stands at a position close enough to directly touch the light receiving surface by hand or indirectly touch the surface with a pointing bar. Thus, the projector capable of performing close projection is appropriate for presentation.

During presentation, for example, the person gives an explanation while touching the light receiving surface by hand or pointing bar in some cases. When light from the projector is blocked by the contact between an object such as hand and pointing bar and the light receiving surface or by bringing the object close to the light receiving surface to such an extent as to contact the surface, shadow of the object is produced on the light receiving surface. When light greatly inclined to the normal line of the light receiving surface and entering the light receiving surface is blocked, longer shadow than that produced by light less inclined to the normal line of the light receiving surface is produced. In case of close projection, therefore, there is a possibility that the long shadow produced on the light receiving surface causes adverse effect on image display.

SUMMARY

It is an advantage of some aspects of the invention to provide a projection system capable of reducing effect on image display caused by an object located close to a light receiving surface in a close projection structure.

A projection system according to a first aspect of the invention includes a first projector and a second projector configured to project light on a light receiving surface according to an image signal, respectively. The first projector and the second projector direct light to be supplied to the light receiving surface in a direction along the light receiving surface. A part of an image projected by the first projector overlaps with a part of an image projected by the second projector on the light receiving surface.

The description "the first projector and the second projector direct light to be supplied to the light receiving surface in a direction along the light receiving surface" refers to the condition in which the angle formed by the normal line of the light receiving surface and light is increased such that light can be directed to travel along the light receiving surface. The angle formed by the normal line of the light receiving surface and light is determined such that light from the projector is not blocked when a person stands at a position close enough to touch the light receiving surface directly by hand or indirectly with a pointing bar or the like. When an object such as a hand and a pointing bar contacts the light receiving surface, light from the projector is blocked. However, by using the plural projectors, light from another projector can be supplied to the area which does not receive light from one projector. Since the light from another projector is supplied to the area which does not receive light from one projector, long shadow is not produced on the light receiving surface even when the object is brought close to the light receiving surface to such an extent as to contact the light receiving surface. Thus, the projection system can reduce the effect on image display caused by bringing the object close to the light receiving surface. In this structure, the boundary between the image projected by the first projector and the image projected by the second projector is not easily recognized, and the sense of incongruity of the image is reduced. By reducing the light amounts provided by the first projector and the second projector such that the amount of the overlapped light becomes a predetermined amount, the sense of incongruity can be further decreased.

It is preferable that the first projector and the second projector are disposed in the vicinity of the outer periphery of the light receiving surface. In this structure, light to be supplied from the first and the second projector to the light receiving surface can travel in the direction along the light receiving surface.

It is preferable that the first projector and the second projector supply light to light receiving areas having substantially the same size. In this structure, the effect on image display caused by bringing the object close to the light receiving surface can be reduced throughout the light receiving surface.

It is preferable that the image projected by the first projector and the image projected by the second projector overlap each other on the light receiving surface. In this structure, the effect on image display caused by bringing the object close to the light receiving surface can be reduced throughout the light receiving surface.

It is preferable that the first projector and the second projector are disposed such that optical axes of projecting systems extend parallel with each other. In this structure, the areas to which light is supplied from the plural projectors are accurately aligned, and the sense of resolution of the respective projectors is not deteriorated.

It is preferable that the first projector and the second projector are disposed opposed to each other via an area through which light travels toward the light receiving surface. When light from the first projector is blocked by the object, for example, the second projector supplies light from the side where shadow is produced with respect to the object. Since light is supplied from the side where shadow is produced with respect to the object, the whole region to which light is not supplied receives light. Thus, the effect on image display caused by bringing the object close to the light receiving surface can be further reduced.

It is preferable that a detection unit which detects light emitted from the first projector and entering the light receiving surface is provided, and that the second projector projects light based on a detection result obtained from the detection unit. When it is detected by the detection unit that light from the first projector is blocked by the object, light is supplied from the second projector to the area which does not receive light from the first projector. Since light is supplied from the second projector to the area which does not receive light from the first projector, the effect on image display caused by bringing the object close to the light receiving surface can be further reduced.

It is preferable that a plurality of the detection units are provided. When shadow produced by the contact between the object and the light receiving surface is detected by one of the detection units, other detection unit continues monitoring the opposite side of the object from the corresponding detection unit. By this method, the presence of shadow can be monitored throughout the light receiving surface.

It is preferable that the second projector projects light to an area where light from the first projector is blocked. In this structure, the effect on image display caused by bringing the object close to the light receiving surface can be reduced.

It is preferable that the detection unit is provided at least on either the first projector or the second projector. In this structure, the first projector or the second projector can detect light having passed through the projecting system from the light receiving surface using the detection unit. By appropriately positioning the detection unit relative to a spatial light modulating device, an image displayed on the light receiving surface can be accurately detected by the detection unit. By using an image pickup element having the same pixel number as that of the spatial light modulating device, each pixel can be controlled.

It is preferable that the light receiving surface extends substantially in parallel with a wall surface. In this structure, an image can be displayed on the light receiving surface substantially parallel with the wall surface.

It is preferable that the light receiving surface extends substantially in parallel with a floor surface. In this structure, an image can be displayed on the light receiving surface substantially parallel with the floor surface.

A projector according to a second aspect of the invention configured to project light on a light receiving surface according to an image signal. The projector directs light to be supplied to the light receiving surface in a direction along the light receiving surface. A part of an image projected by the projector overlaps with a part of an image projected by other projector on the light receiving surface.

A projection system according to a third aspect of the invention includes a plurality of projectors configured to project light on a light receiving surface according to an image signal, respectively. The plural projectors are arranged at the position of the screen neighborhood where the screen is not interrupted when seen from the front, and direct light to be supplied to the light receiving surface in a direction along the light receiving surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings.

First Embodiment

Figure 1:
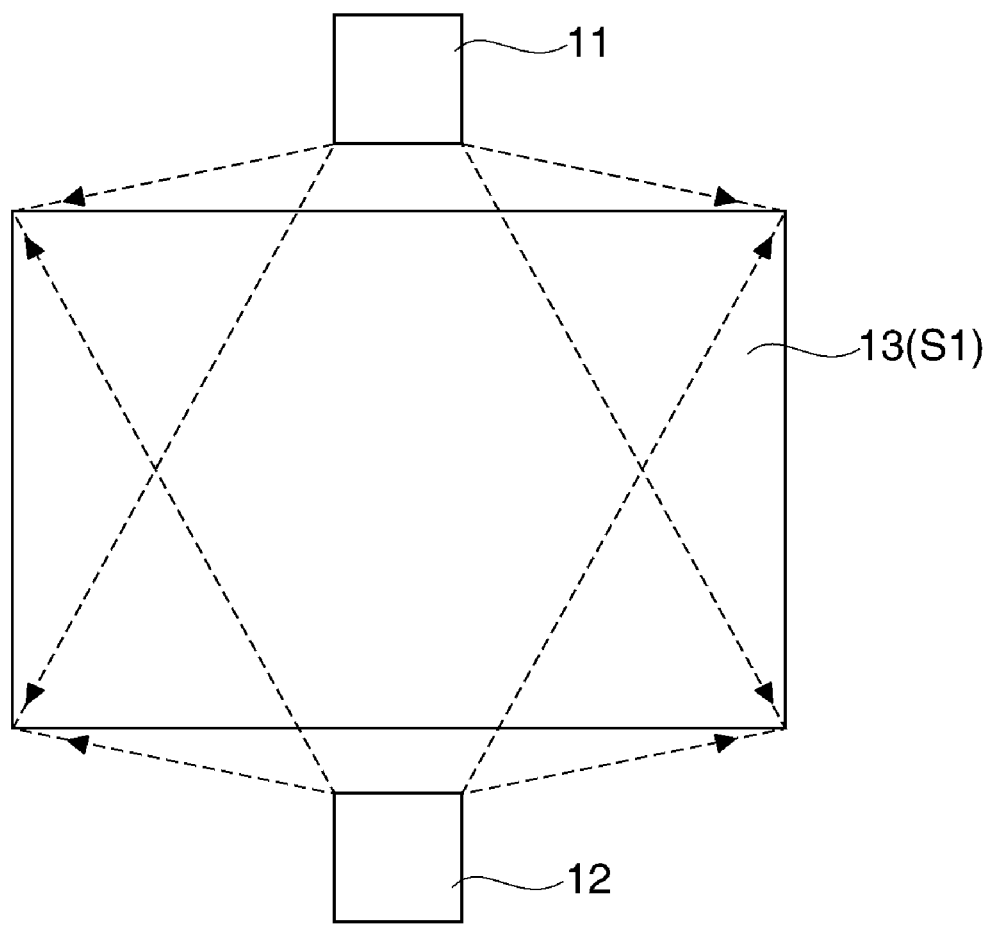
FIG. 1 illustrates a front structure of a projection system according to a first embodiment of the invention.
Figure 2:
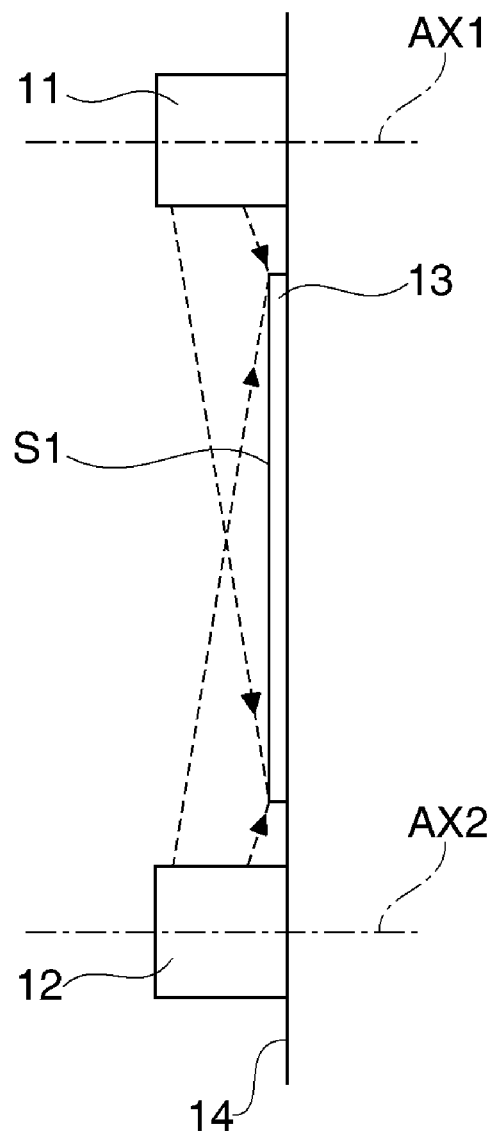
FIG. 2 illustrates a side structure of the projection system shown in FIG. 1.

FIG. 1 illustrates a front structure of a projection system according to a first embodiment of the invention. FIG. 2 is a side structure of the projection system shown in FIG. 1. The projection system includes a first projector 11 and a second projector 12. The first projector 11 and the second projector 12 are attached to a common wall surface 14. The first projector 11 and the second projector 12 project light to a screen 13 attached to the wall surface 14.

The screen 13 is disposed such that a light receiving surface S1 faces on the side opposite to the side fixed to the wall surface 14. Also, the screen 13 is positioned such that the light receiving surface S extends substantially in parallel with the wall surface 14. The first projector 11 is located above the screen 13 in the vertical direction. The second projector 12 is located below the screen 13 in the vertical direction. Both the first projector 11 and the second projector 12 are positioned in the vicinity of the outer periphery of the light receiving surface S1. The first projector 11 and the second projector 12 are arranged at the position of the screen neighborhood where the screen is not interrupted when seen from the front. The (optical axis) positions of the first projector 11 and the second projector 12 substantially coincide with the center position of the light receiving surface S1 in the horizontal direction. The first projector 11 and the second projector 12 are opposed to each other via an area through which light travels toward the light receiving surface S1.

Figure 3:
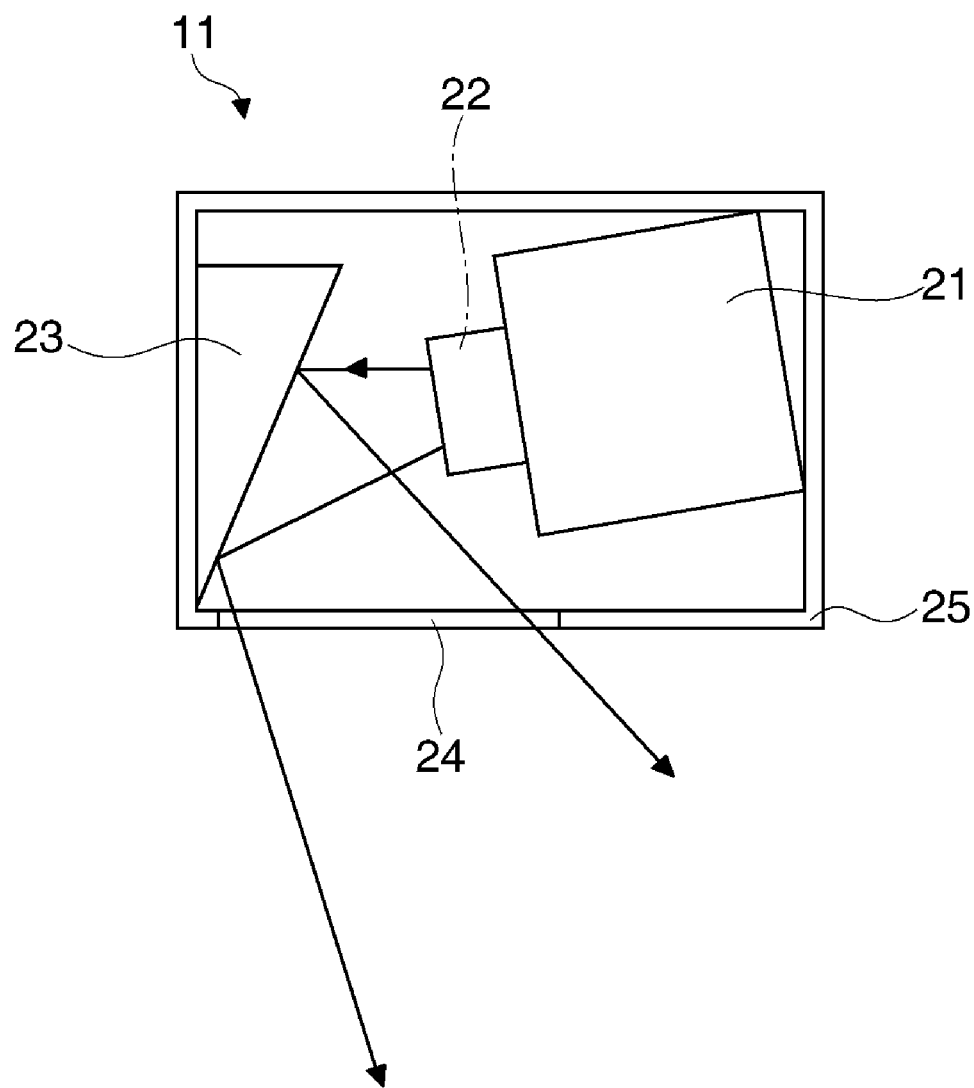
FIG. 3 schematically illustrates a first projector.

FIG. 3 schematically illustrates the first projector 11. The first projector 11 has an optical engine 21, a projection lens 22, and an aspherical mirror 23. The optical engine 21, the projection lens 22, and the aspherical mirror 23 are accommodated in a housing 25.

Figure 4:
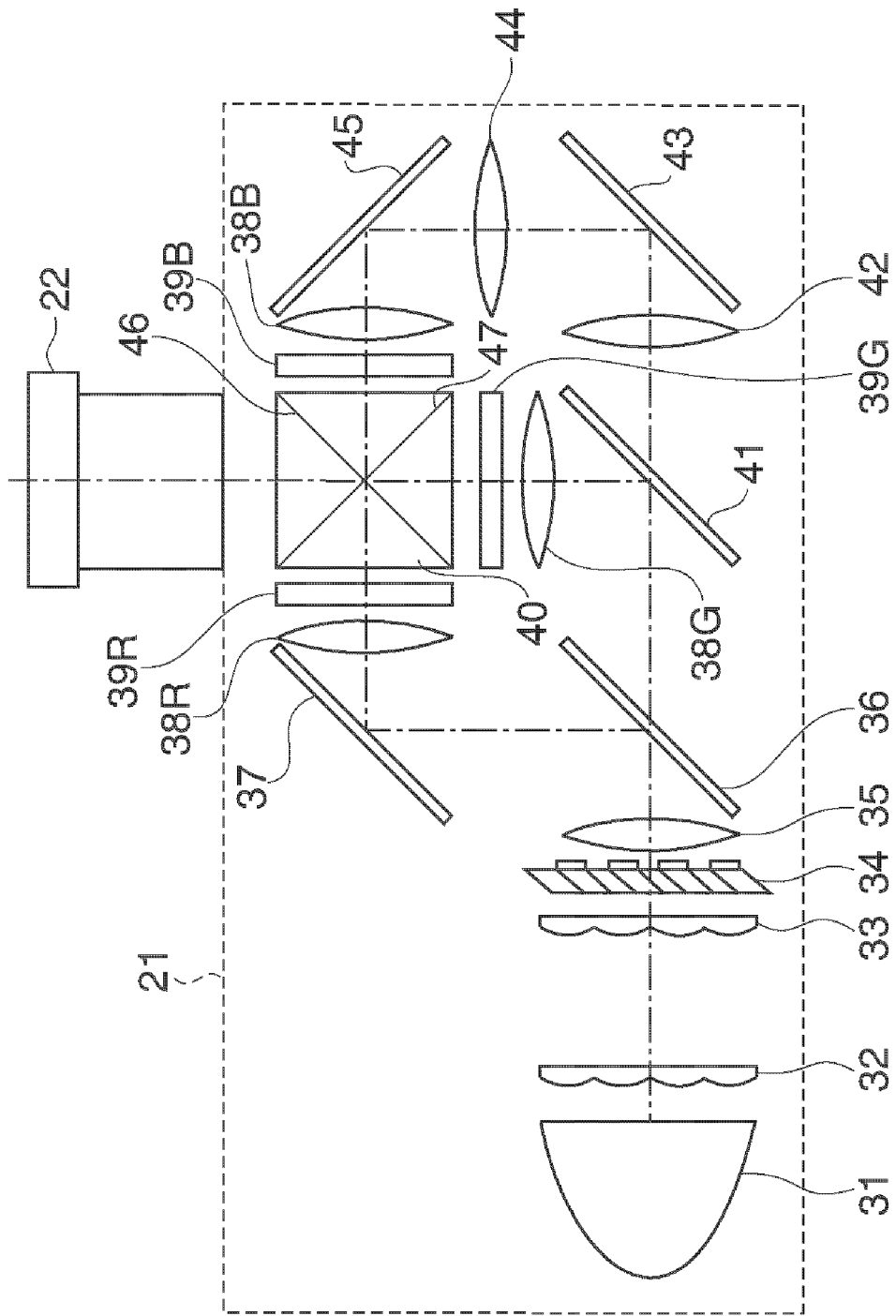
FIG. 4 illustrates structures of an optical engine and a projection lens.

FIG. 4 illustrates structures of the optical engine 21 and the projection lens 22. An extra-high pressure mercury lamp 31 is a light source unit which emits light containing red (R) light, green (G) light, and blue (B) light. Each of a first integrator lens 32 and a second integrator lens 33 has a plurality of lens elements arranged in array. The first integrator lens 32 divides light emitted from the extra-high pressure mercury lamp 31 into plural partial lights. The respective lens elements of the first integrator lens 32 converge the light emitted from the extra-high pressure mercury lamp 31 in the vicinity of the lens elements of the second integrator lens 33. The lens elements of the second integrator lens 33 form images of the lens elements of the first integrator lens 32 on spatial light modulating devices.

The light having passed through the two integrator lenses 32 and 33 are converted into linear polarized light in a particular oscillating direction by a polarization converting element 34. A superimposing lens 35 superimposes the images of the respective lens elements of the first integrator lens 32 on the spatial light modulating devices. The first integrator lens 32, the second integrator lens 33, and the superimposing lens 35 equalize the intensity distribution of light emitted from the extra-high pressure mercury lamp 31 on the spatial light modulating devices. The light released from the superimposing lens 35 enters the first dichroic mirror 36. The first dichroic mirror 36 reflects R light and transmits G light and B light. The R light having entered the first dichroic mirror 36 is reflected by the first dichroic mirror 36 and the reflection mirror 37 such that the optical path of the R light is bent, and then enters an R light field lens 38R. The R light field lens 38R collimates the R light released from the reflection mirror 37, and supplies the collimated R light to an R spatial light modulating device 39R.

The R spatial light modulating device 39R is a spatial light modulating unit which modulates R light according to image signals as a transmission-type liquid crystal display device. A not-shown liquid crystal panel provided on the R spatial light modulating device 39R contains liquid crystal layer sealed between two transparent substrates for modulating light according to image signals. The R light modulated by the R spatial light modulating device 39R enters a cross dichroic prism 40 as a color combining system.

The G light and B light having passed the first dichroic mirror 36 enter the second dichroic mirror 41. The second dichroic mirror 41 reflects G light and transmits B light. The G light having entered the second dichroic mirror 41 is reflected by the second dichroic mirror 41 such that the optical path is bent, and then enters a G light field lens 38G. The G light field lens 38G collimates the G light released from the second dichroic mirror 41, and supplies the collimated light to a G spatial light modulating device 39G. The G spatial light modulating device 39G is a spatial light modulating unit which modulates G light according to image signals as a transmission-type liquid crystal display device. The G light modulated by the G spatial light modulating device 39G enters a surface of the cross dichroic prism 40 different from the surface to which the R light enters.

The B light having passed through the second dichroic mirror 41 passes a relay lens 42, and then is reflected by a reflection mirror 43 such that the optical path is bent. The B light released from the reflection mirror 43 further passes through a relay lens 44, and then is reflected by a reflection mirror 45 such that the optical path is bended and enters a B light field lens 38B. Since the optical path of the B light is longer than those of the R light and G light, a relay system having relay lenses 42 and 44 are used so that the illumination magnification of the spatial light modulating device for B light becomes equal to those of the spatial light modulating devices for other colors.

The B light field lens 38B collimates the B light released from the reflection mirror 45 and supplies the collimated B light to the B spatial light modulating device 39B. The B light spatial light modulating device 39B is a spatial light modulating unit which modulates B light according to image signals as a transmission-type liquid crystal display device. The B light modulated by the B spatial light modulating device 39B enters a surface of the cross dichroic prism 40 different from those to which the R light and G light enter.

The cross dichroic prism 40 has two dichroic films 46 and 47 so disposed as to cross each other approximately at right angles. The first dichroic film 46 reflects the R light, and transmits the G light and B light. The second dichroic film 47 reflects the B light and transmits the R light and G light. The cross dichroic prism 40 combines the R light, G light, and B light entering in different directions, and releases the combined light toward the projection lens 22. The projection lens 22 is a projecting system which projects light combined by the cross dichroic prism 40.

The transmission-type liquid crystal display device is constituted by a high-temperature polysilicon (HTPS) TFT liquid crystal panel, for example. The structure of the optical engine 21 is not limited to that containing the transmission-type liquid crystal display device as the spatial light modulating device, but may include a reflection-type liquid crystal display device (liquid crystal on silicon; LCOS) DMD (digital micro-mirror device), GLV (grating light valve) or the like. The spatial light modulating deice need not be provided for each color light, but a color sequential system for sequentially supplying respective color lights to a common spatial light modulating device may be employed. The optical engine 21 is not limited to the structure including the extra-high pressure mercury lamp 31 as the light source unit. The light source unit may be a structure using lamp other than the extra-high pressure mercury lamp 31, solid light source such as light emission diode (LED) and super luminescence diode (SLD), laser beam source, or the like.

Returning to FIG. 3, the aspherical mirror 23 has a reflection surface as an aspherical convexed curve surface. The ashperical mirror 23 widens the angle of light coming from the projection lens 22 chiefly in the horizontal direction by reflection. Also, the aspherical mirror 23 bends the light coming from the projection lens 22 by reflection such that the light travels toward the light receiving surface S1 (see FIG. 2). The aspherical mirror 23 is formed by providing reflection film on a substrate having resin material or the like, for example. The reflection film is constituted by high-reflection material layer including metal material such as aluminum, dielectric multilayer film, or others. Protection film having transparent material may be provided on the reflection film.

Thus, the aspherical mirror 23 simultaneously achieve bending and angle-widening of light by the curved reflection surface. By using the aspherical mirror 23 as well as the projection lens 22 to widen the light angle, the projection lens 22 can be made more compact than the structure which uses only the projection lens 22 for widening the light angle. The projection lens 22 and the aspherical mirror 23 enlarge and form images on the light receiving surface S1. The projection lens 22 has functions of enlarging and forming images on the light receiving surface S1. The aspherical mirror 23 has function of enlarging images. It is possible to modify the aspherical mirror 23 in an appropriate manner such that the aspherical mirror 23 can correct distortion of images.

An emission unit 24 emits light released from the aspherical mirror 23 to the outside of the housing 25. The emission unit 24 is provided on the surface of the housing 25 facing downward in the vertical direction. The emission unit 24 is constituted by a transparent member disposed in such a condition as to completely close an opening formed on the housing 25. The first projector 11 emits light diagonally downward from the emission unit 24 toward the light receiving surface S1. The first projector 11 may completely accommodate the aspherical mirror 23 inside the housing 25, or a part of the aspherical mirror 23 may project through an opening formed on the housing 25.

Figure 5:
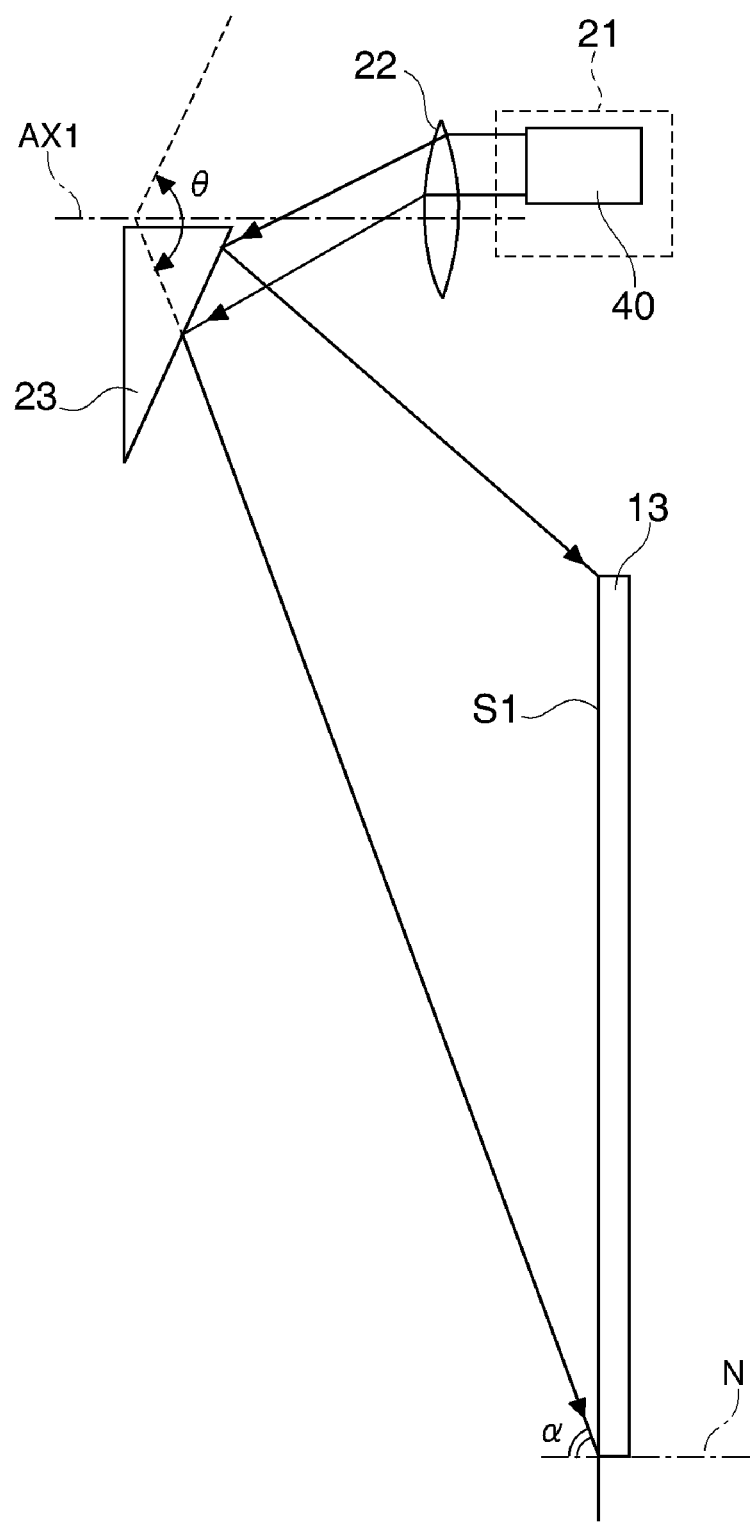
FIG. 5 schematically illustrates an optical system of the first projector.

FIG. 5 schematically illustrates optical system included in the first projector 11. This figure does not show components unnecessary for explanation of the first projector 11. The aspherical mirror 23 may have a substantially rotation-symmetric shape with respect to the center axis, for example, a shape as a portion other than the top portion cut from a cone. The center axis of the aspherical mirror 23 approximately corresponds to optical axis AX1 of the projection lens 22. In this embodiment, the center axis of the aspherical mirror 23 corresponds to the optical axis of the aspherical mirror 23. The projection lens 22 and the aspherical mirror 23 constitute a common-axis optical system having the common optical axis AX1. The screen 13 is disposed such that the normal line N of the light receiving surface S1 extends substantially parallel with the optical axis AX1 of the projection lens 22 and the aspherical mirror 23.

For constituting the common-axis optical system, an ordinary common-axis designing method can be employed. Thus, the number of steps required for the design of the optical system can be decreased, and aberration produced by the optical system can be reduced. Moreover, the optical axis of the aspherical mirror 23 can be easily aligned with optical axes of other components by forming the aspherical mirror 23 as a component having a substantially rotation-symmetric shape with respect to the optical axis AX1. Since the aspherical surface mirror 23 has an axis-symmetric aspherical shape, the aspherical surface mirror 23 can be processed by an easy method such as process using a lathe. Thus, the aspherical mirror 23 can be easily manufactured with high accuracy. The optical system is not limited to the structure which includes the asperical mirror having a convex surface, but may be a structure which includes an aspherical mirror having a concave surface. The reflection surface is not limited to a surface having aspherical shape, but may be a surface having free curved shape. The optical system is not limited to a common-axis optical system, but may be a decentering optical system where optical axes of respective optical elements do not coincide with each other. In case of decentering optical system, the method in this embodiment can be used by defining an axis perpendicular to the light receiving surface of the spatial light modulating device as optical axis.

The projection lens 22 and the aspherical mirror 23 constitute a so-called shift optical system which shifts light modulated according to image signals to a particular side with respect to the optical axis AX1 during travel of the light. More specifically, this system shifts the light modulated according to image signals downward in the vertical direction as the particular side with respect to the optical axis AX1 during travel of the light. The central normal line of an image surface virtually formed on the emission surface of the cross dichroic prism 40 included in the optical engine 21 extends in parallel with the optical axis AX1 and above the optical axis AX1 on the side opposite to the particular side. By employing the shift optical system, the first projector 11 can supply light having large incident angle to the light receiving surface S1. The incident angle is an angle formed by the normal line N of the light receiving surface S1 and the entering light.

The first projector 11 performs close projection by using the projection lens 22 and the aspherical mirror 23. For close projection, the angle of light to be projected is widened. An image angle θ of the first projector 11 is 150 degrees or larger, such as 160 degrees. The first projector 11 employs shift optical system which uses only a part of the widened angle range of the widened angle such that light entering the light receiving surface S1 travels along the light receiving surface S1.

The description "such that light entering the light receiving surface S1 travels along the light receiving surface S1" herein refers to the condition that the angle formed by a normal line N of the light receiving surface S1 and the light is enlarged such that light can be directed to travel along the light receiving surface S1. The description "light is directed to travel along the light receiving surface S1" refers to that the maximum angle α formed by the light entering the light receiving surface S1 and the normal line N lies in the range from 65 degrees to 85 degrees, for example. By this method, the first projector 11 projects light from a position in the vicinity of the outer periphery of the light receiving surface S1 to the substantially entire area of the light receiving surface S1.

Figure 6:
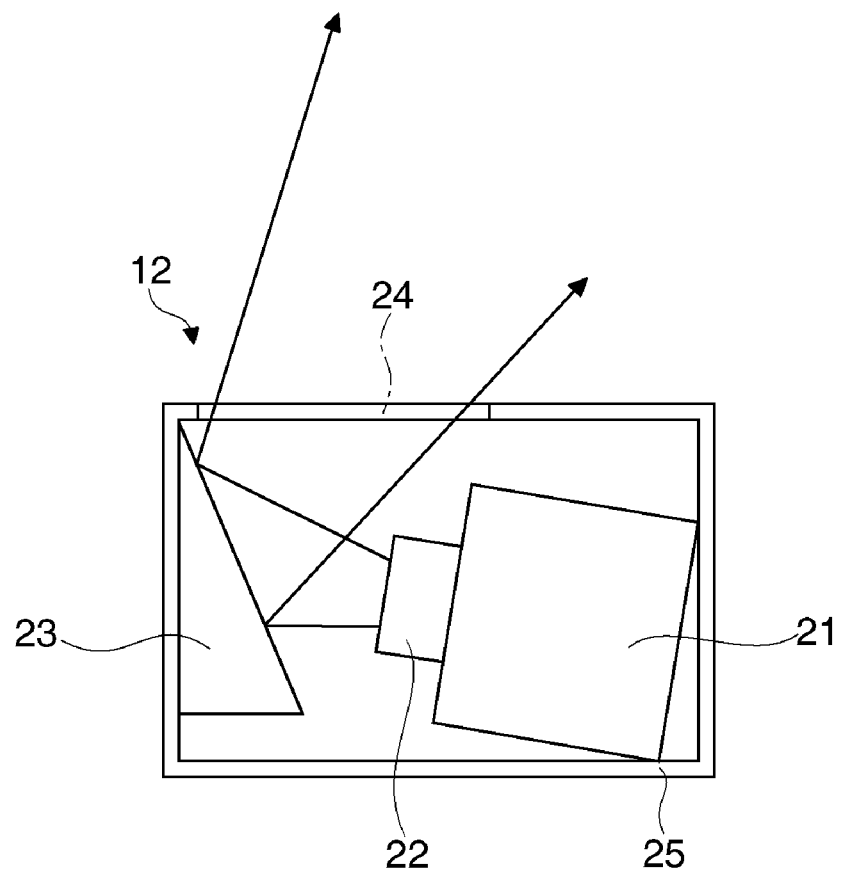
FIG. 6 schematically illustrates a second projector.

FIG. 6 schematically illustrates the structure of the second projector 12. The second projector 12 has the optical engine 21, the projection lens 22, the aspherical mirror 23, the emission unit 24, and the housing 25 similarly to the first projector 11. The emission unit 24 is disposed on the surface of the housing 25 facing upward in the vertical direction. The second projector 12 emits light diagonally upward from the emission unit 24 toward the light receiving surface S1.

The projection lens 22 and the aspherical mirror 23 of the second projector 12 constitute the common-axis optical system and shift optical system similarly to the first projector 11. The second projector 12 shifts light modulated according to image signals such that the light can travel upward in the vertical direction with respect to the optical axis on the side opposite to that of the first projector 11. The second projector 12 also directs light entering the light receiving surface S1 such that the light can travel along the light receiving surface S1 similarly to the first projector 11. The second projector 12 projects light from a position in the vicinity of the outer periphery of the light receiving surface S1 toward the substantially entire area of the light receiving surface S1.

As illustrated in FIGS. 1 and 2, the first projector 11 and the second projector 12 project light to the substantially whole area of the light receiving surface S1. The first projector 11 and the second projector 12 supply light to light receiving areas having substantially equal size. The light receiving area of the first projector 11 and the light receiving area of the second projector 12 overlap with each other on the light receiving area S1. The projection system displays an image by overlapping the light from the first projector 11 and the light from the second projector 12 on the light receiving surface S1.

The optical axis AX1 of the projection lens 22 of the first projector 11 and the optical axis AX2 of the projection lens 22 of the second projector 12 are substantially parallel with each other. In this structure, the light receiving area of the first projector 11 can be accurately aligned with the light receiving area of the second projector 12 on the light receiving area S21, and thus the deterioration in sense of resolution of the first and second projectors 11 and 12 is reduced. The first and second projectors 11 and 12 may be modified as long as the requirement that light to be supplied to the light receiving surface S1 can travel in the direction along the light receiving surface S1.

For example, a mirror for bending the optical path may be provided between the projection lens 22 and the aspherical mirror 23 of the first projector 11 or the second projector 12.

Figure 7:
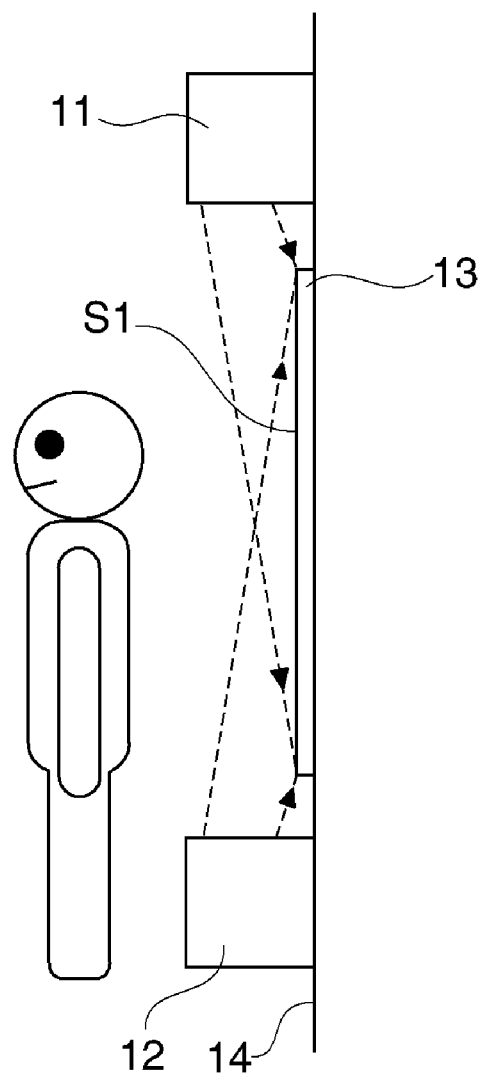
FIG. 7 shows the projection system used for presentation.

FIG. 7 illustrates the case in which the projection system in this embodiment is used for presentation. When light is projected from the first projector 11 and the second projector 12 disposed in the vicinity of the outer periphery of the light receiving surface S1, blocking of light is more easily prevented than that of a related-art projector disposed at a position away from the light receiving surface S1 and opposed to the light receiving surface S1. Even when a person giving an explanation stands at a position close to the light receiving surface enough to touch the light receiving surface S1 directly by hand or indirectly using a pointing bar or the like, the person can give presentation without blocking both the light from the first projector 11 and the light from the second projector 12.

Figure 8:
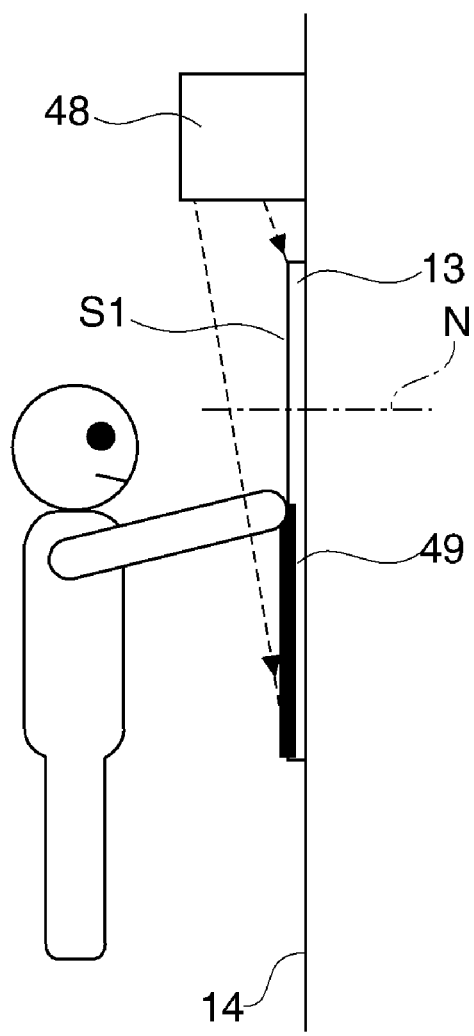
FIG. 8 shows projection of light by using a single projector.

FIG. 8 illustrates the case in which only a single projector 48 projects light as a comparison example of this embodiment. The projector 48 performs close projection from above the light receiving surface S1 in the vertical direction similarly to the first projector 11. In some cases, the person gives an explanation while touching the light receiving surface S1 by hand or using a pointing bar or the like during presentation. When light from the projector 48 is blocked by the contact between the light receiving surface S1 and an object such as the hand or a pointing bar, or by bringing the object to a position close enough to contact the light receiving surface S1, shadow 49 of the object is produced on the light receiving surface S1 below the object. When light greatly inclined to the normal line N of the light receiving surface S1 enters the light receiving surface S1, the shadow 49 longer than that produced by light less inclined to the normal line N direction of the light receiving surface S1 is produced. Thus, in case of close projection by using the single projector 48, adverse effect is given on image display by the long shadow 49 on the light receiving surface S1.

Figure 9:
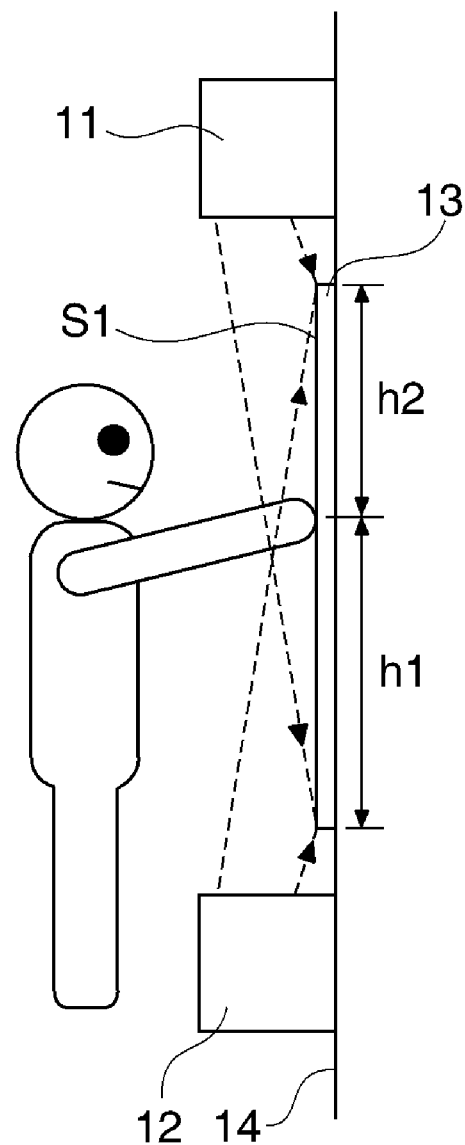
FIG. 9 shows projection of light by using the first projector and the second projector.

FIG. 9 illustrates the case in which light is projected from the first projector 11 and the second projector 12 included in the projection system according to this embodiment. When the object is brought into contact with or to a position close enough to contact with the light receiving surface S1, the light from the first projector 11 does not reach a predetermined area h1 below the object in the vertical direction. In this case, light from the second projector 12 is supplied to the area h1. Since the area h1 receives light from the second projector 12, no shadow is produced on the area h1.

In this condition, the light from the second projector 12 does not reach a predetermined area h2 above the object in the vertical direction. In this case, light from the first projector 11 is supplied to the area h2. Since the area h2 receives light from the first projector 11, no shadow is produced on the area h2. In this structure which disposes the first projector 11 and the second projector 12 opposed to each other via the areas through which the lights from the projectors 11 and 12 travel toward the light receiving surface S1, light can be supplied from the side on which shadow is produced with respect to the object. Since light is supplied from the side on which shadow is produced with respect to the object, the entire region of the area h1 which does not receive the light from the first projector 11 and the entire region of the area h2 which does not receive the light from the second projector 12 can be illuminated.

Since light from one of the first and second projectors 11 and 12 reaches the area to which light from the other of the projectors 11 and 12 is not supplied, generation of long shadow on the light receiving surface S1 is prevented even when the object is brought to a position close enough to contact the light receiving surface S1. Thus, the effect on image display caused by bringing the object close to the light receiving surface S1 can be reduced. Moreover, the effect on image display caused by bringing the object close to the light receiving surface S1 can be decreased throughout the region of the light receiving surface S1 since the light receiving areas of the first projector 11 and the second projector 12 have substantially the same size.

Figure 10:
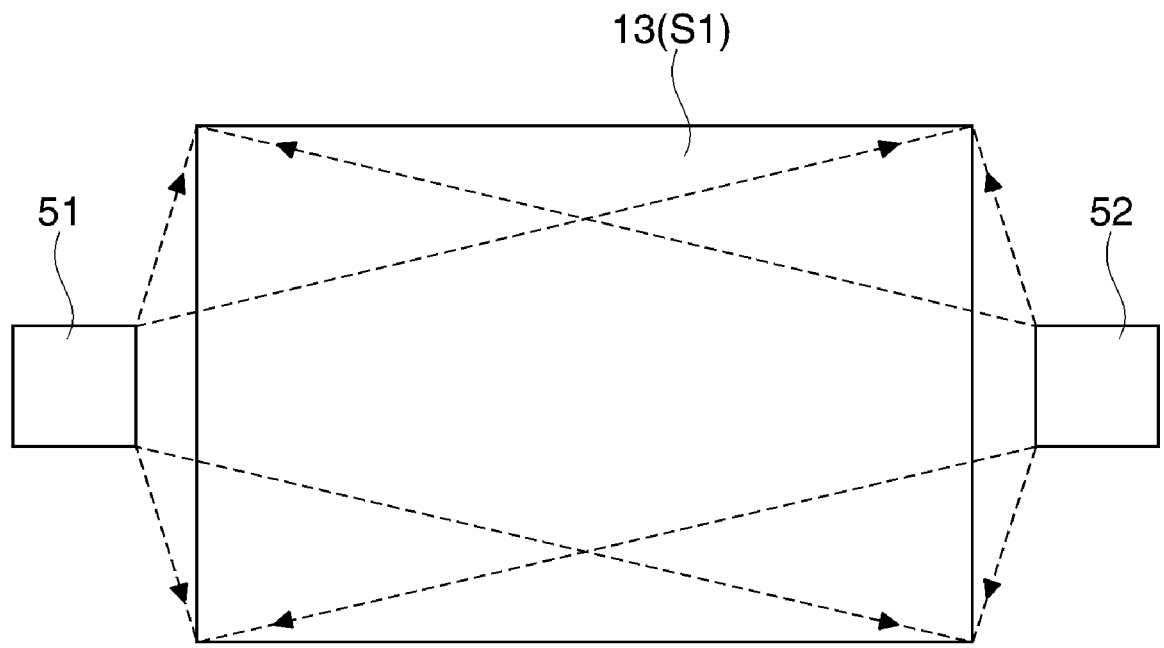
FIG. 10 illustrates a front structure of a projection system according to a modified example of the first embodiment.

FIG. 10 illustrates a front structure of a projection system in a modified example of this embodiment. The projection system in this modified example includes a first projector 51 and a second projector 52. The first projector 51 is disposed on the left side of the screen 13 in such a position as to face the light receiving surface S1. The second projector 52 is disposed on the right side of the screen 13 in such a position as to face the light receiving surface S1. The first projector 51 and the second projector 52 are disposed in the vicinity of the outer periphery of the light receiving surface S1. The (optical axes) positions of the first projector 51 and the second projector 52 substantially coincide with the center position of the light receiving surface S1. The first projector 51 and the second projector 52 are opposed to each other via the areas through which light from the first and second projectors 51 and 52 travels toward the light receiving surface S1.

The first projector 51 projects light to the right side of the light receiving surface S1. The second projector 52 projects light to the left side of the light receiving surface S1. Both the first projector 51 and the second projector 52 supply light to the light receiving surface S1 such that the light travels along the light receiving surface S1. The first projector 51 and the second projector 52 have structures similar to those of the first projector 11 and the second projector 12 in the above embodiment, respectively, except that the lights from the first and second projectors 51 and 52 travel in different directions. Similarly to the above embodiment, the effect on image display caused by bringing the object close to the light receiving surface S1 can be reduced in this modified example.

The first projector 11 and the second projector 12 may be projectors having combined aspheical mirrors instead of the projection lens 22. The first projector 11 and the second projector 12 are not limited to projectors having the common optical axes AX1 and AX2, but maybe projectors employing so-called decentering optical system having no common optical axis.

The projection system is not limited to the structure which disposes the projectors at the positions discussed in this embodiment, but may have other structure as long as projectors are opposed to each other via the areas through which light travels toward the light receiving surface S1. For example, the projectors of the projection system may be disposed in the vicinity of the corners of the light receiving surface S1. The projectors disposed opposed to each other shift light in the opposite directions with respect to the optical axis. The projection system is not limited to the structure including two projectors, but may have three or more projectors. For example, the projection system may have one projector at each of positions on the upper, lower, left, and right sides of the light receiving surface S1, that is, four projectors in total.

The projection system including plural projectors provides the following advantages. For example, bright display can be achieved by overlapping the same images using plural projectors. Moreover, high-contrast display can be achieved by supplying light only to a desired area using at least one of plural projectors. Furthermore, effective performance can be provided by overlapping different images using plural projectors. In addition, the life of the light source unit can be extended by sequentially driving respective projectors.

Second Embodiment

Figure 11:
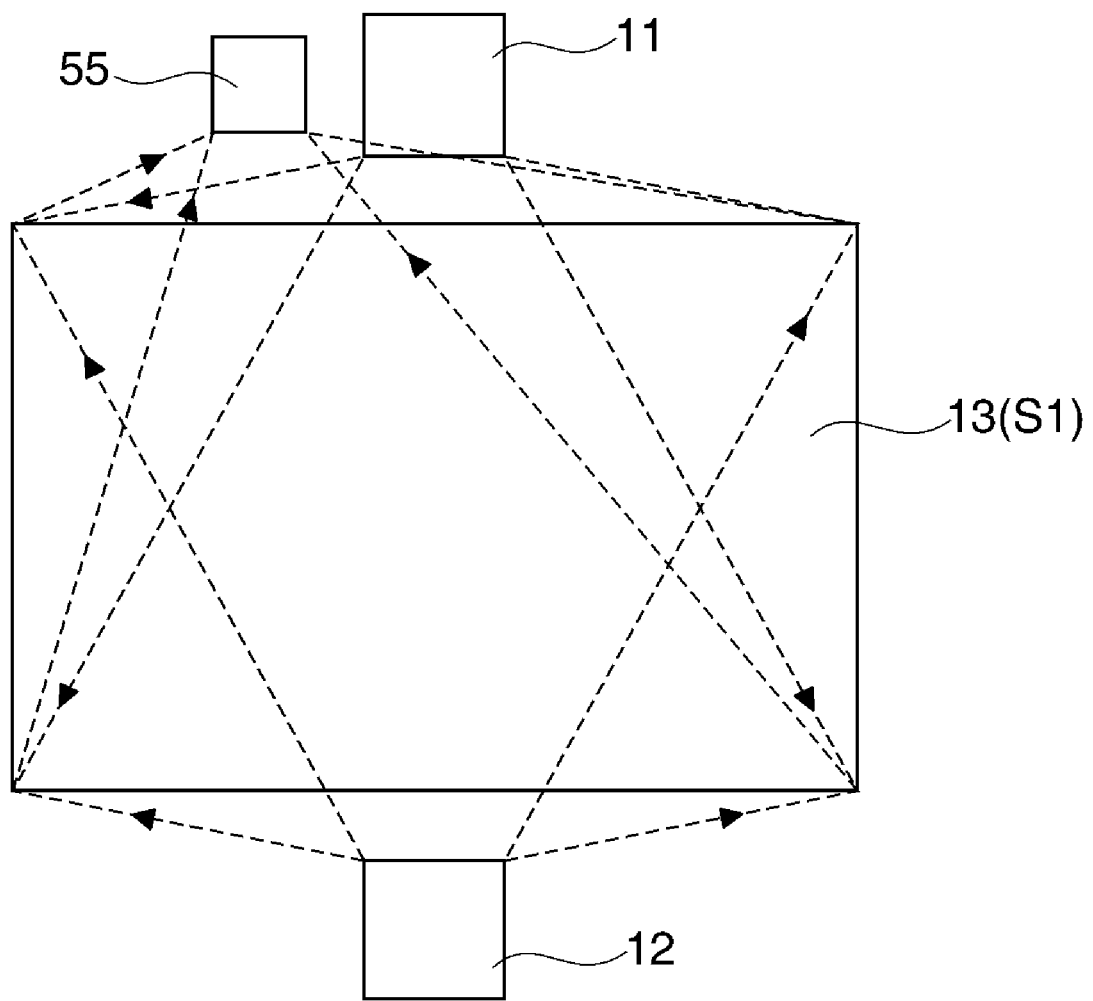
FIG. 11 illustrates a front structure of a projection system according to a second embodiment of the invention.

FIG. 11 illustrates a front structure of a projection system according to a second embodiment of the invention. The projection system in this embodiment is characterized by including a detection camera 55. Similar reference numbers are given to parts similar to those in the first embodiment, and the same explanation is not repeated herein. The detection camera 55 functions as a detection unit for detecting light entering the light receiving surface S1 from the first projector 11. The detection camera 55 is disposed in the vicinity of the first projector 11. The detection camera 55 has a plurality of light receiving elements (not shown) which convert entering light into electronic signals. The detection camera 55 is constituted by CCD or CMOS sensor, for example.

The projection system displays images using only light emitted from the first projector 11 as long as the light supplied from the first projector 11 is not blocked by an object. The detection camera 55 obtains an image of the whole area of the light receiving surface S1. The detection camera 55 monitors the presence or absence of an area which does not receive light from the first projector 11 by comparing information on the shot image and an image signal given to the first projector 11.

When light from the first projector 11 is blocked by the object, the detection camera 55 recognizes the area to which the light from the first projector 11 is not supplied due to the presence of the object. The second projector 12 supplies light to the area which does not receive the light from the first projector 11 on the light receiving surface S1 based on the detection result obtained from the detection camera 55. Similarly to the above embodiment, the effect on image display caused by bringing the object close to the light receiving surface S1 can be reduced in this embodiment. Also, images corresponding to image signals can be displayed without delay by constantly monitoring the presence or absence of the area which does not receive the light from the first projector 11 using the detection camera 55.

Figure 12:
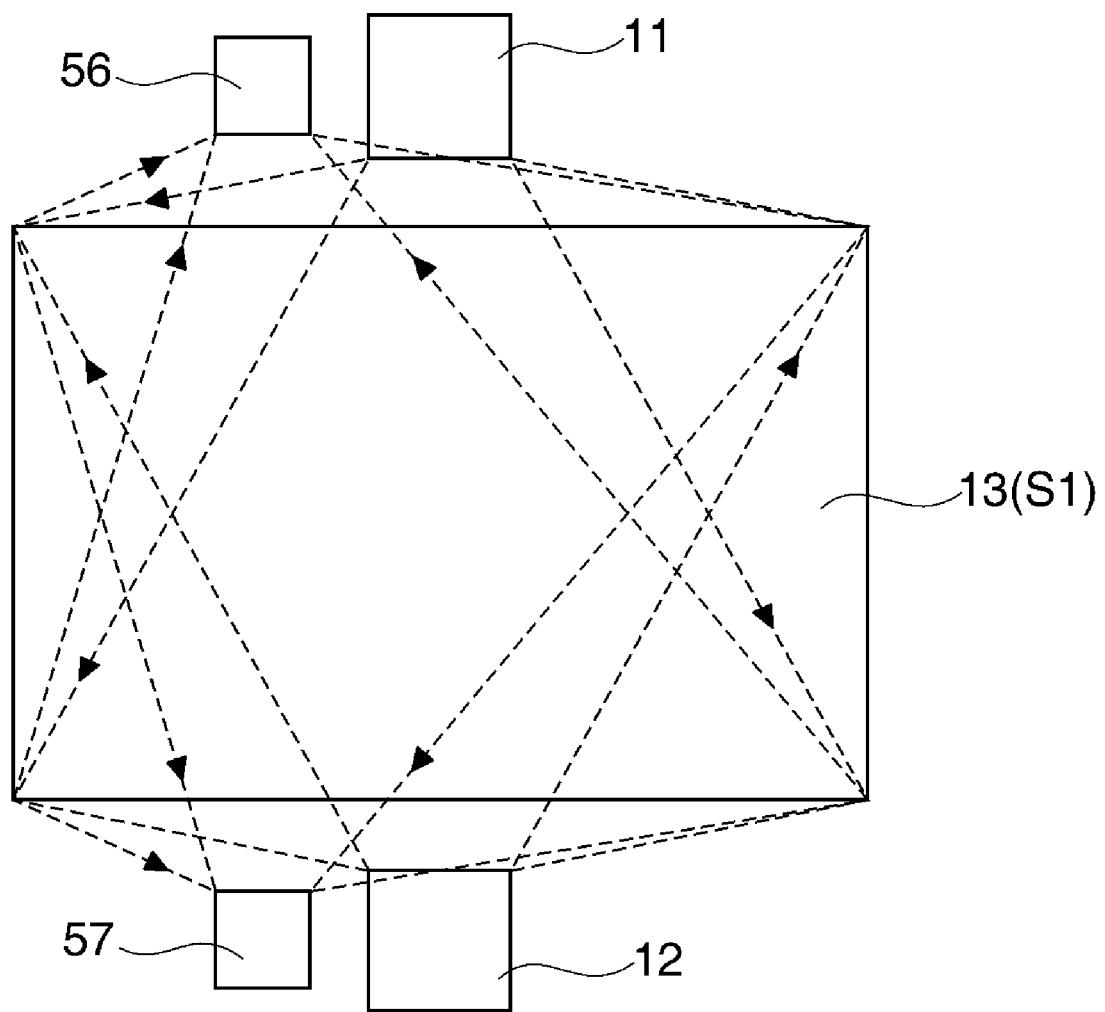
FIG. 12 illustrates a front structure of a projection system according to a modified example of the second embodiment.

FIG. 12 illustrates a front structure of a projection system in a modified example of this embodiment. The projection system in this modified example has a first detection camera 56 and a second detection camera 57. The first detection camera 56 and the second detection camera 57 function as detection units for detecting light entering the light receiving surface S1 from the first projector 11. The first detection camera 56 is disposed in the vicinity of the first projector 11. The second detection camera 57 is disposed in the vicinity of the second projector 12. The first detection camera 56 and the second detection camera 57 are disposed opposed to each other via the area through which light travels toward the light receiving surface S1.

When light from the first projector 11 is blocked by the object, the area between the object and the first detection camera 56 is monitored by the first detection camera 56. The area between the object and the second detection camera 57 is monitored by the second detection camera 57. By using both the first detection camera 56 and the second detection camera 57, a blind spot which cannot be monitored is reduced. Thus, the effect on image display caused by bringing the object close to the light receiving surface S1 can be further reduced. The projection system is not limited to the structure including one or two detection cameras, but may have three or more detection cameras.

Figure 13:
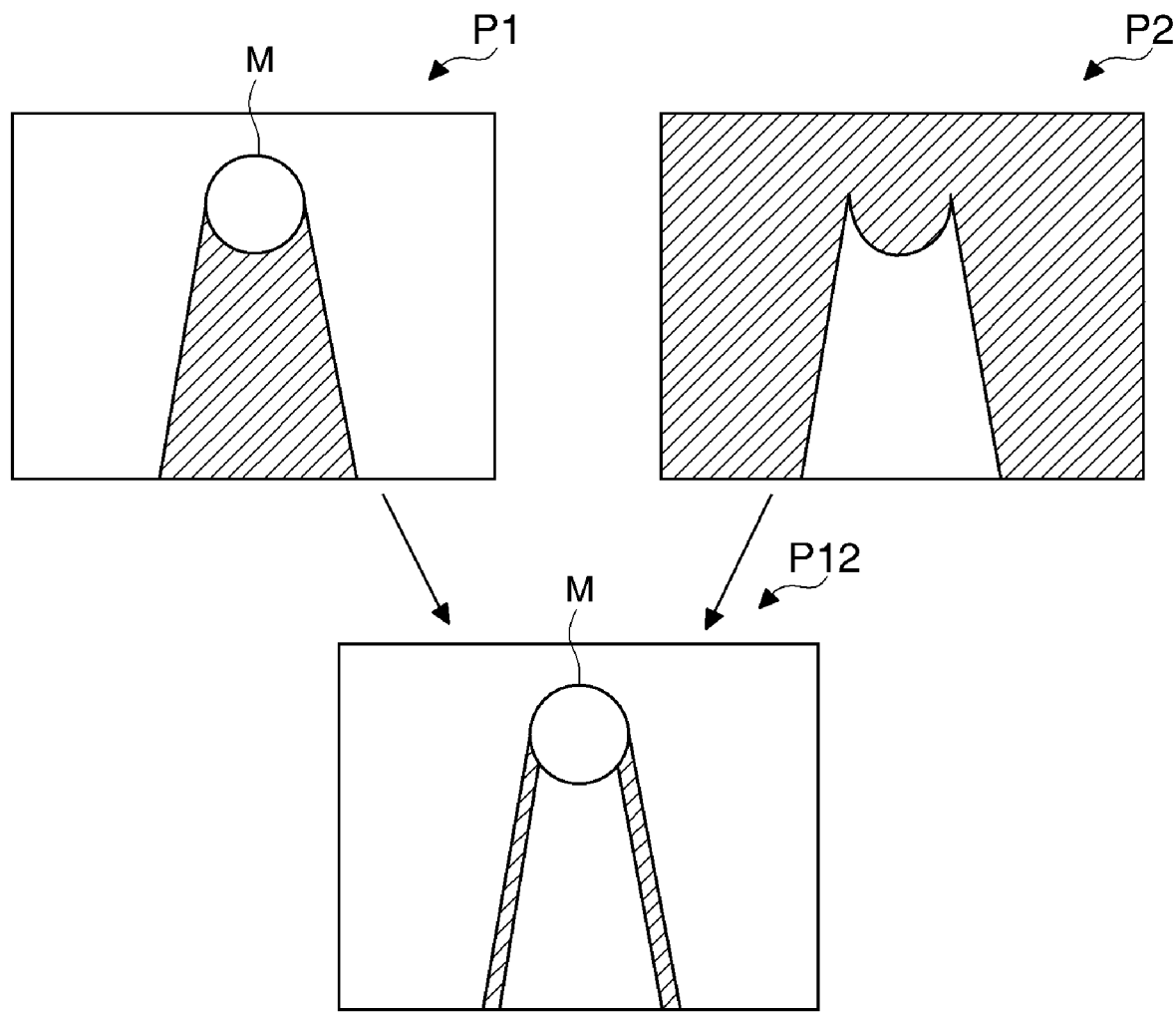
FIG. 13 shows a problem caused by light supplied from the second projector.

FIG. 13 is a figure for explaining a problem caused when light is supplied from the second projector 12 to an area which does not receive light from the first projector 11. When light from the first projector 11 is blocked by an object M, shadow shown by a shaded portion in the figure is produced on an image P1 formed by the light from the first projector 11. When the image P1 is detected by the detection camera, the second projector 12 displays an image P2 containing an area corresponding to the shadow to which light is supplied as indicated by a white portion. It is extremely difficult to match the portion to which light is supplied from the second projector 12 with the shadow portion on the image P1 with high accuracy due to the component difference between the first projector 11 and the second projector 12, deviation between the optical systems, or for other reasons. For example, there is a possibility that the shadow boundary remains on an image P12 formed by combining the image P1 and the image P2 as indicated by a shaded portion in the figure.

Figure 14:
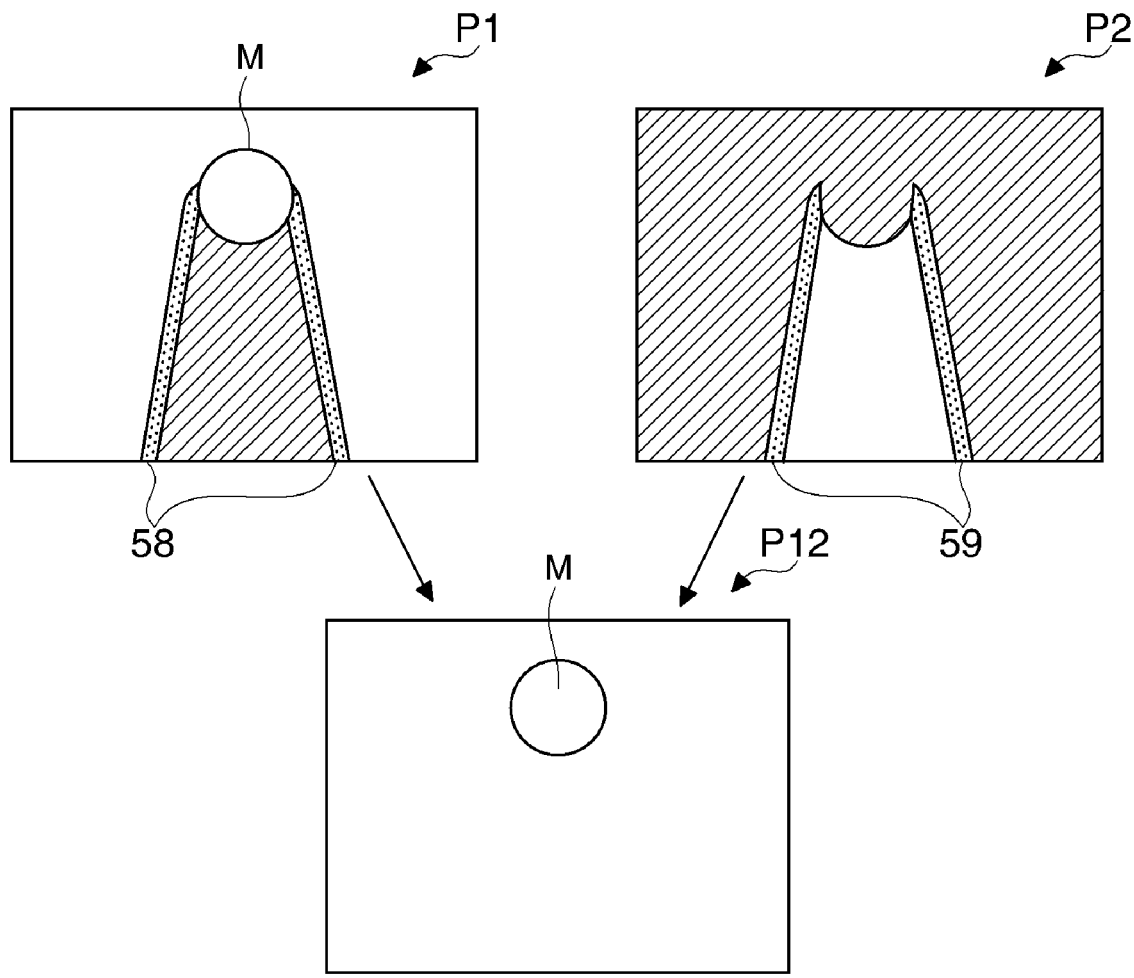
FIG. 14 illustrates a preferable example of the second embodiment.

FIG. 14 illustrates a preferable condition according to this embodiment. When light from the first projector 11 is blocked by the object M, the second projector 12 also supplies light to a boundary area 59 adjacent to the area corresponding to the shade on the image P2. As a result, a boundary area 58 adjacent to the shadow area on the first image P1 formed by the light from the first projector 11 and the boundary area 59 on the image P2 formed by the second projector 12 are overlapped on the image P12 as a combination of the image P1 and the image P2. In this projection system, therefore, it is preferable that a part of the image projected by the first projector 11 and a part of the image projected by the second projector 12 are overlapped on the light receiving surface S1.

When the boundary areas 58 and 59 are overlapped, no shadow remains on the boundary portion. It is preferable that the light amount on each of the boundary area 58 on the image P1 and the boundary area 59 on the image P2 is reduced to half of the light amount corresponding to the image signal. By this method, higher brightness of only the part on which the boundary areas 58 and 59 are overlapped on the image P12 is prevented, and natural connection between the area receiving the light from the first projector 11 and the area receiving the light from the second projector 12 is provided. Since these areas are naturally connected, incongruity of the image P12 is lowered.

Figure 15:
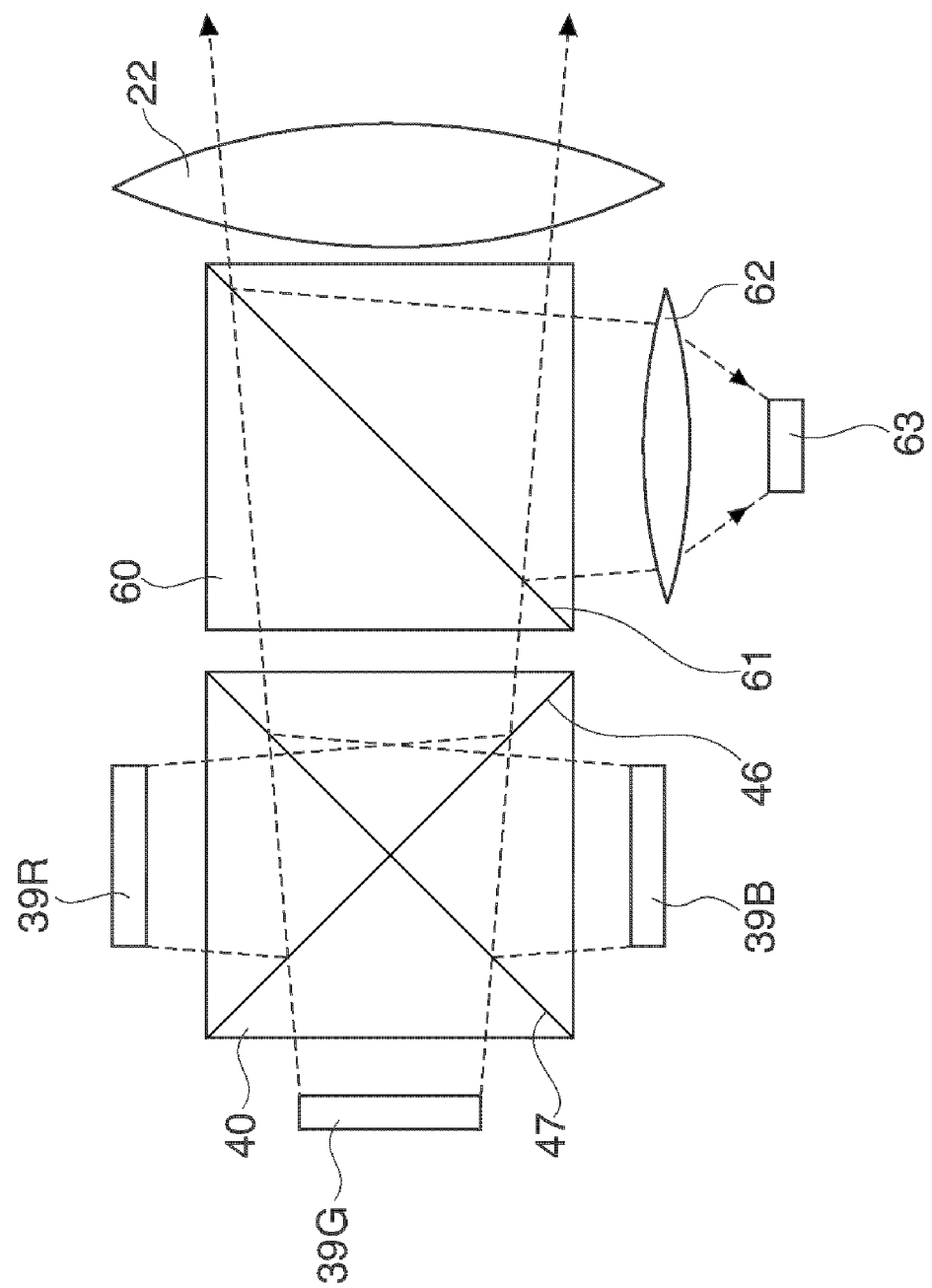
FIG. 15 illustrates a structure example including a detection camera provided on the first projector.

FIG. 15 illustrates an example of the first projector 11 including a detection camera 63. This figure does not show components of the first projector 11 unnecessary for explanation. A polarized light separating element 60 is disposed on the optical path between the cross dichroic prism 40 and the projection lens 22. The polarized light separating element 60 is formed by affixing two triangular prisms. A polarized light selecting film 61 is provided on the connection surface between the two triangular prisms. The polarized light selecting film 61 is a dielectric multilayer film which transmits first polarized light and reflects second polarized light. The first polarized light is a linear polarized light in a first oscillation direction such as s-polarized light. The second polarized light is a linear polarized light in a second oscillation direction substantially orthogonal to the first oscillation direction such as p-polarized light.

Each of spatial light modulating devices 39R, 39G, and 39B emits the first polarized light. The first polarized light having entered the polarized light separating element 60 from the cross dichroic prism 40 passes through the polarized light selecting film 61, and enters the projection lens 22. A part of the first polarized light supplied from the projection lens 22 to the light receiving surface S1 is converted into the second polarized light by reflection on the light receiving surface S1 and the like. The second polarized light contained in the light having entered from the light receiving surface S1 into the polarized light separating element 60 via the projection lens 22 is reflected by the polarized light selecting film 61. The second polarized light whose optical path is bent by the reflection on the polarized light selecting film 61 is released from the polarized light separating element 60, and then supplied to the converging lens 62. The light having entered the converging lens 62 further enters the detection camera 63. The first projector 11 detects the light having passed the projection lens 22 from the light receiving surface S1 using the detection camera 63.

The image displayed on the light receiving surface S1 can be accurately detected by the detection camera 63 by appropriately positioning the detection camera 63 relative to the respective spatial light modulating devices 39R, 39G, and 39B. Each pixel can be controlled by using an image pickup element having the same pixel number as those of the spatial light modulating devices 39R, 39G, and 39B. Other optical elements may be used in place of the polarized light separating element 60. For example, a transmissive reflection mirror which transmits a part of entering light and reflects the other part of the light may be used. Alternatively, a wavelength separating element which transmits visible light and reflects infrared light may be used. The detection camera 63 can monitor the presence or absence of the area which does not receive light from the projector by detecting infrared light supplied to the light receiving surface S1. Other example is a hologram having such characteristics that transmit light from the cross dichroic prism 40 and direct light from the projection lens 22 toward the detection camera 63. The detection camera 63 may be disposed on the second projector 12 as well as on the first projector 11. The projection system is thus only required to include the detection camera 63 disposed at least on either the first projector 11 or the second projector 12.

Third Embodiment

Figure 16:
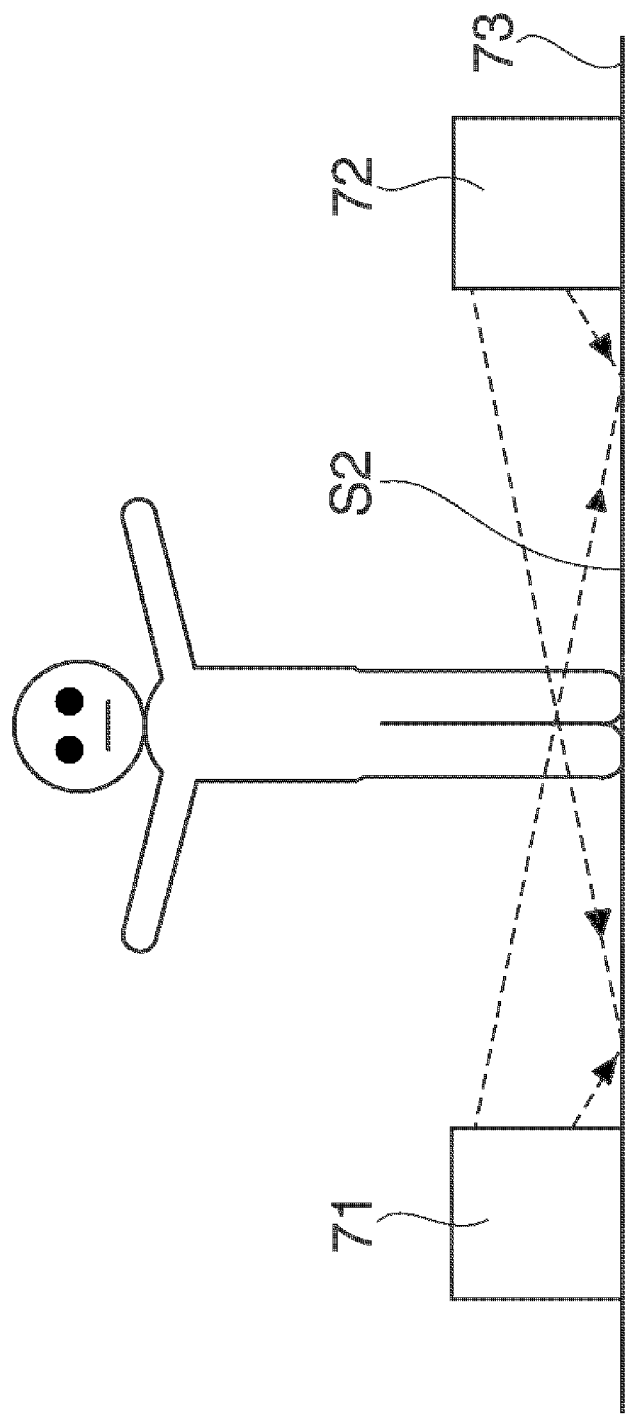
FIG. 16 illustrates a side structure of a projection system according to a third embodiment of the invention.

FIG. 16 is a side structure of a projection system according to a third embodiment of the invention. The projection system in this embodiment is characterized in that a part of a floor surface 73 is a light receiving surface S2. The same explanation as in those the above embodiments is not repeated herein. A first projector 71 and a second projector 72 are attached onto the floor surface 73. The first projector 71 and the second projector 72 supply light to an area between the first projector 71 and the second projector 72 on the floor surface 73. The first projector 71 and the second projector 72 are disposed opposed to each other at positions facing the area through which light travels toward the light receiving surface S2.

The first projector 71 and the second projector 72 both direct light to be supplied to the light receiving surface S2 in the directions along the light receiving surface S2. The first projector 71 and the second projector 72 have structures similar to those of the first projector 11 and the second projector 12 except for different light traveling directions.

According to the projection system in this embodiment, a person can stand on the light receiving surface S2. The first projector 71 and the second projector 72 supply light traveling along the light receiving surface S2 to such an extent that the light does not enter the eyes of the person standing on the light receiving surface S2. The person standing on the light receiving surface S2 keeps blocking light while contacting the light receiving surface S2. In the structure having only one projector, shadow is always produced on the light receiving surface S2 when the person stands on the light receiving surface S2. When the first projector 71 and the second projector 72 are used, the possibility of producing shadow on the light receiving surface S2 can be decreased even when the person stands on the light receiving surface S2. According to the projection system in this embodiment, therefore, the effect on image display caused by the person or object standing on the light receiving surface S2 can be reduced.

The projection system in this embodiment is not limited to the structure in which a part of the floor surface 73 is the light receiving surface S2. The projection system may have any structure as long as it can supply light to the light receiving surface S2 substantially parallel with the floor surface 73. For example, the light receiving surface S2 of the projection system may be the upper surface of stand, desk, table, or the like. In this case, the effect on image display caused by a part of the human body or object placed on the upper surface can be similarly reduced. The projection system may be installed on the ceiling surface and a part of which is used as the light receiving surface.

Figure 17:
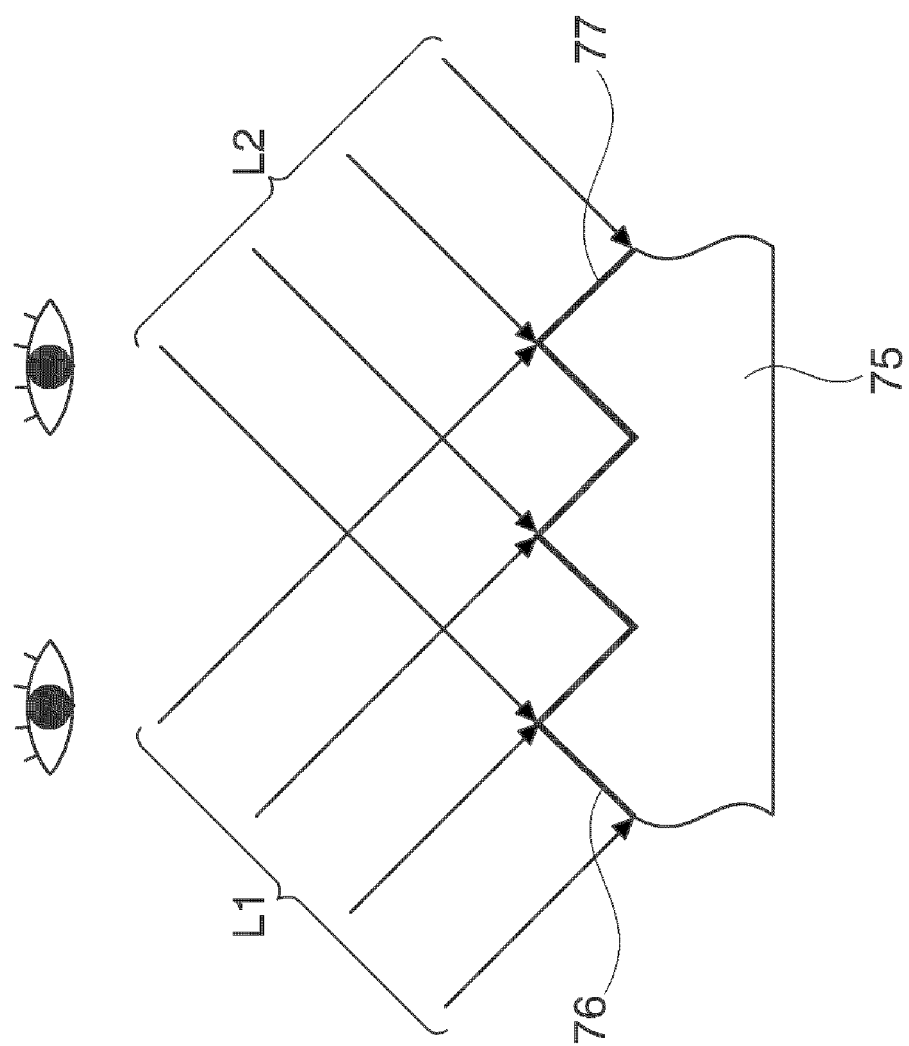
FIG. 17 illustrates a first application example of the projection system according to the invention.
Figure 18:
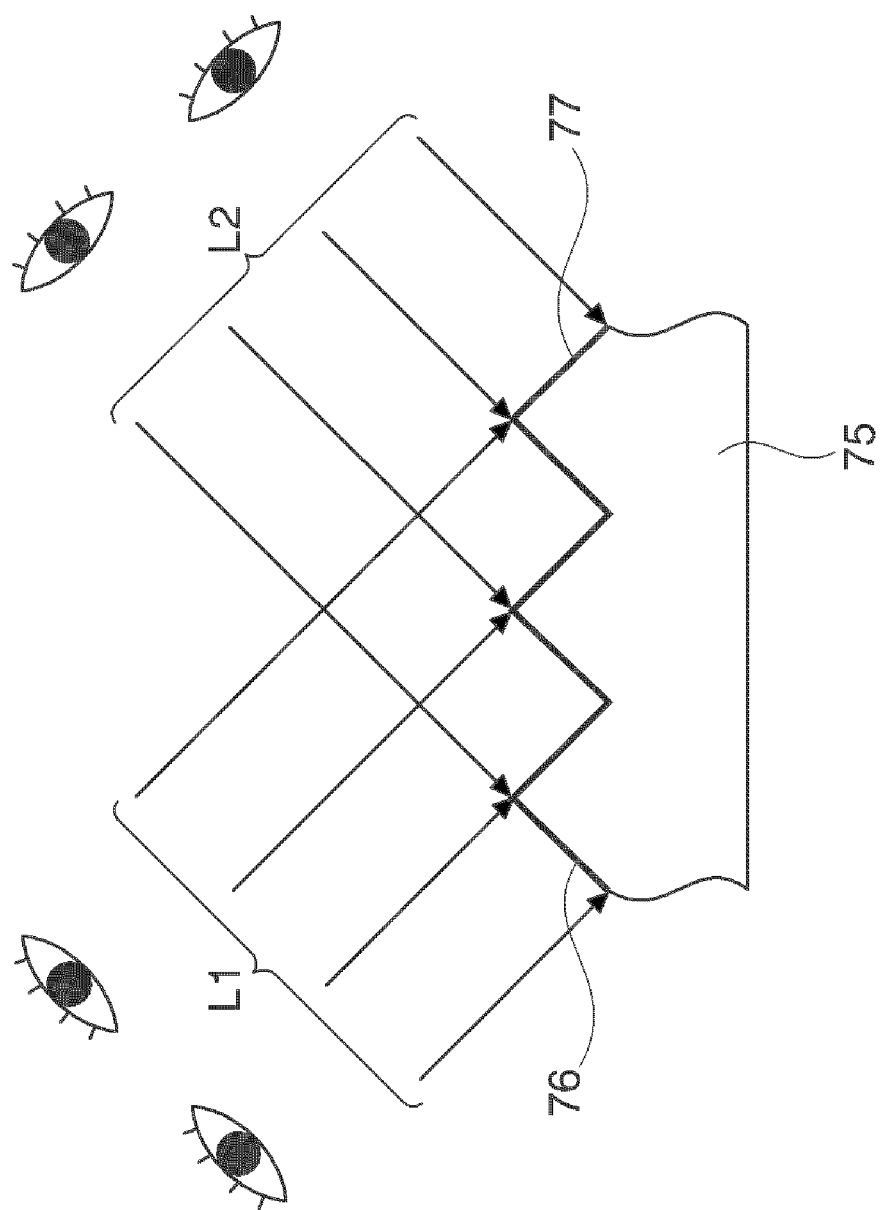
FIG. 18 illustrates a second application example of the projection system according to the invention.

FIGS. 17 and 18 illustrate application examples of the projection system according to the invention. The projector included in the projection system can equalize the light traveling directions by employing shift optical system which supplies light in a part of the angle range of the super-wide angle. The projection system according to the invention may be combined with a screen 75 having a plurality of convexes on the light receiving surface.

The convexes are constituted by first surfaces 76 and second surfaces 77. Each of the convexes has a triangular cross-sectional structure. The first surfaces 76 are inclined such that light L1 from the first projector (not shown) enters at an angle close to the right angle. The second surfaces 77 are inclined such that light L2 from the second projector (not shown) enters at an angle close to the right angle. As in the first application example shown in FIG. 17, the right eye and the left eye of the observer can recognize different images by utilizing the advantage that the visibility angles of the light L1 and the light L2 can be controlled by the screen 75. Since the right eye and the left eye of the observer recognize different images, three-dimensional images can be displayed. Moreover, as in the second application example shown in FIG. 18, different images can be recognized at the position opposed to the first surface 76 and at the position opposed to the second surface 77. Thus, effective performance can be provided by using the projection system according to the invention.

Accordingly, the projection system of the invention is particularly suitable for presentation.

The entire disclosure of Japanese Patent Application NOs: 2008-008809, filed Jan. 18, 2008, and 2008-318002, filed Dec. 15, 2008 are expressly incorporated by reference herein.

What is claimed is:

1. A projection system, comprising:
 a first projector and a second projector configured to project light on a light receiving surface according to an image signal, respectively,
 wherein the first projector and the second projector direct light to be supplied to the light receiving surface in a direction along the light receiving surface, and
 a part of an image projected by the first projector overlaps with a part of an image projected by the second projector on the light receiving surface,
 wherein the first projector and second projector each include an aspherical mirror or free curved mirror which reflects the projected light to the light receiving surface,
 wherein the first projector and the second projector are attached to a flat wall surface with the light receiving surface being formed therebetween, and
 wherein a first optical axis of the first projector and a second optical axis of the second projector are substantially parallel with a normal line extending from a center position of the light receiving surface.

2. The projection system according to claim 1, wherein the first projector and the second projector are disposed in the vicinity of the outer periphery of the light receiving surface.

3. The projection system according to claim 1, wherein the first projector and the second projector supply light to light receiving areas having substantially the same size.

4. The projection system according to claim 3, wherein the image projected by the first projector and the image projected by the second projector overlap each other on the light receiving surface.

5. The projection system according to claim 1, wherein the first projector and the second projector are disposed such that optical axes of projecting systems extend parallel with each other.

6. The projection system according to claim 1, wherein:
the first projector and the second projector are disposed opposed to each other via an area through which light travels toward the light receiving surface.

7. The projection system according to claim 1, wherein:
a detection unit configured to detect light emitted from the first projector and entering the light receiving surface is provided; and
the second projector projects light based on a detection result obtained from the detection unit.

8. The projection system according to claim 7, wherein a plurality of the detection units are provided.

9. The projection system according to claim 7, wherein the second projector projects light to an area where light from the first projector is blocked.

10. The projection system according to claim 7, wherein the detection unit is provided at least on either the first projector or the second projector.

11. The projection system according to claim 1, wherein the light receiving surface extends substantially in parallel with a wall surface.

12. The projection system according to claim 1, wherein the light receiving surface extends substantially in parallel with a floor surface.

13. A projector configured to project light on a light receiving surface according to an image signal,
wherein the projector includes an aspherical mirror or free curved mirror which directs light to be supplied to the light receiving surface in a direction along the light receiving surface, and
a part of an image projected by the projector overlaps with a part of an image projected by another projector on the light receiving surface,
wherein the projector and the another projector are attached to a flat wall surface with the light receiving surface being formed therebetween, and
wherein a first optical axis of the projector and a second optical axis of the another projector substantially parallel with a normal line extending from a center position of the light receiving surface.

14. A projection system, comprising:
at least two projectors configured to project light on a light receiving surface according to an image signal, respectively,
wherein at least two projectors are arranged at the position of the light receiving surface neighborhood where the light receiving surface is not interrupted when seen from the front, and direct light to be supplied to the light receiving surface in a direction along the light receiving surface,
a part of an image projected by the at least two projectors overlap on the light receiving surface,
wherein the at least two projectors each include an aspherical mirror or free curved mirror which reflects the projected light to the light receiving surface,
wherein the at least two projectors are attached to a flat wall surface with the light receiving surface being formed therebetween, and
wherein an optical axis of the at least two projectors substantially parallel with a normal line extending from a center position of the light receiving surface.

15. A projection system, comprising:
a first projector and a second projector configured to project light on a light receiving surface according to an image signal, respectively,
wherein the first projector and the second projector each include an aspherical mirror or free curved mirror which reflects the projected light to the light receiving surface in a direction along the light receiving surface,
wherein the first projector and second projector project same images, the image projected by the first projector overlaps with the image projected by the second projector on the light receiving surface,
wherein the first projector and the second projector are opposed to each other via an area through which light travels toward the light receiving surface, and
wherein a first optical axis of the first projector and a second optical axis of the second projector are substantially parallel with a normal line extending from a center position of the light receiving surface.

* * * * *